United States Patent
Eastman et al.

(10) Patent No.: US 10,139,016 B1
(45) Date of Patent: Nov. 27, 2018

(54) GARDEN HOSE SUPPORT ASSEMBLY

(71) Applicants: John Eastman, Boring, OR (US); Jeanne Eastman, Boring, OR (US)

(72) Inventors: John Eastman, Boring, OR (US); Jeanne Eastman, Boring, OR (US)

( * ) Notice: Subject to any disclaimer, the term of this patent is extended or adjusted under 35 U.S.C. 154(b) by 0 days.

(21) Appl. No.: 15/708,196

(22) Filed: Sep. 19, 2017

(51) Int. Cl.
| | |
|---|---|
| *F16L 3/00* | (2006.01) |
| *F16L 3/18* | (2006.01) |
| *A01G 25/02* | (2006.01) |
| *F16L 3/02* | (2006.01) |

(52) U.S. Cl.
CPC .............. *F16L 3/18* (2013.01); *A01G 25/02* (2013.01); *F16L 3/02* (2013.01)

(58) Field of Classification Search
CPC .............. F16L 3/00; F16L 3/003; F16L 3/02
USPC ......................................... 248/75, 80, 81, 89
See application file for complete search history.

(56) References Cited

U.S. PATENT DOCUMENTS

| | | | | |
|---|---|---|---|---|
| 1,831,306 A | * | 11/1931 | Kakimoto | A01G 25/00 242/157 R |
| 2,816,734 A | | 12/1957 | Crofoot | |
| 3,829,065 A | * | 8/1974 | Less | A01G 25/00 242/157 R |
| 5,437,424 A | * | 8/1995 | Netz, Sr. | F16L 3/00 248/49 |
| D369,092 S | | 4/1996 | Sauber | |
| 5,573,226 A | | 11/1996 | Smith | |
| 6,332,595 B1 | * | 12/2001 | Klucznik | F16L 1/0246 248/80 |
| 7,007,929 B2 | | 3/2006 | Kwon | |
| 7,527,227 B1 | * | 5/2009 | Mondello | A62C 33/00 242/615.2 |
| 8,052,098 B1 | | 11/2011 | Kowaleski | |
| 8,342,483 B1 | | 1/2013 | Manning | |
| 8,561,951 B2 | * | 10/2013 | Wills | A01G 25/00 248/71 |
| 9,631,355 B1 | * | 4/2017 | Taraszkiewicz | E03F 1/008 |
| 2001/0028021 A1 | * | 10/2001 | Martin | B65H 57/14 248/87 |
| 2004/0232276 A1 | * | 11/2004 | Ferris | B65H 57/06 242/615.1 |
| 2015/0048222 A1 | | 2/2015 | Eley et al. | |

* cited by examiner

Primary Examiner — Steven M Marsh

(57) ABSTRACT

A garden hose support assembly for holding a garden hose above ground includes a hold attached to a support. The hold forming a receiving space for receiving a hose. The hold includes a first arm, a second arm and a middle arm extending between and being attached to the first arm and the second arm. The first arm and the second arm are angularly positionable relative to the middle arm. A plurality of rollers is provided. Each of the first arm, the second arm and the middle arm has one of the rollers positioned thereon. The rollers are rotatable with respect to the hold. A mount is attached to a distal end of the first arm relative to the middle arm. The mount engages a vertically oriented surface such that the hold extends laterally away from the vertically oriented surface.

4 Claims, 6 Drawing Sheets

GARDEN HOSE SUPPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to garden hose's and more particularly pertains to a new garden hose support for supporting a garden hose above a ground surface.

BRIEF SUMMARY OF THE INVENTION

An embodiment of the disclosure meets the needs presented above by generally comprising a hold configured to be attached to a support. The hold forms a receiving space for receiving a hose. The hold including a first arm, a second arm and a middle arm extending between and attached to the first and second arms. The first and second arms are angularly positionable relative to the middle arm and are releasably securable in a selected angular position relative to the middle arm. A plurality of rollers is provided and each of the first, second and middle arms has one of the rollers positioned thereon. The rollers are rotatable with respect to the hold. A mount is attached to a distal end of the first arm relative to the middle arm. The mount is configured to engage a vertically oriented surface such that the hold extends laterally away from the vertically oriented surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
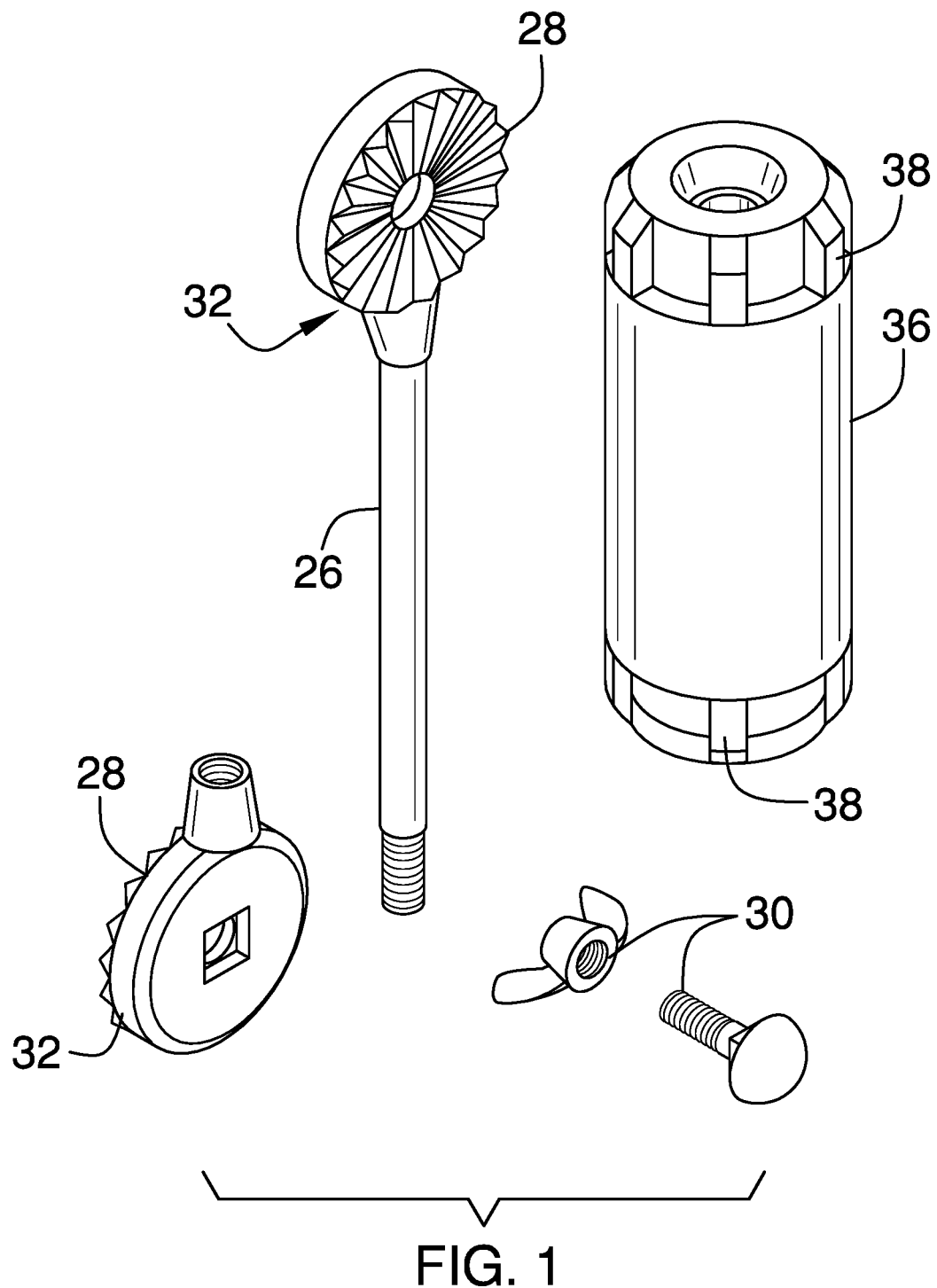
FIG. 1 is a perspective view of components of the garden hose support assembly according to an embodiment of the disclosure.
Figure 2:
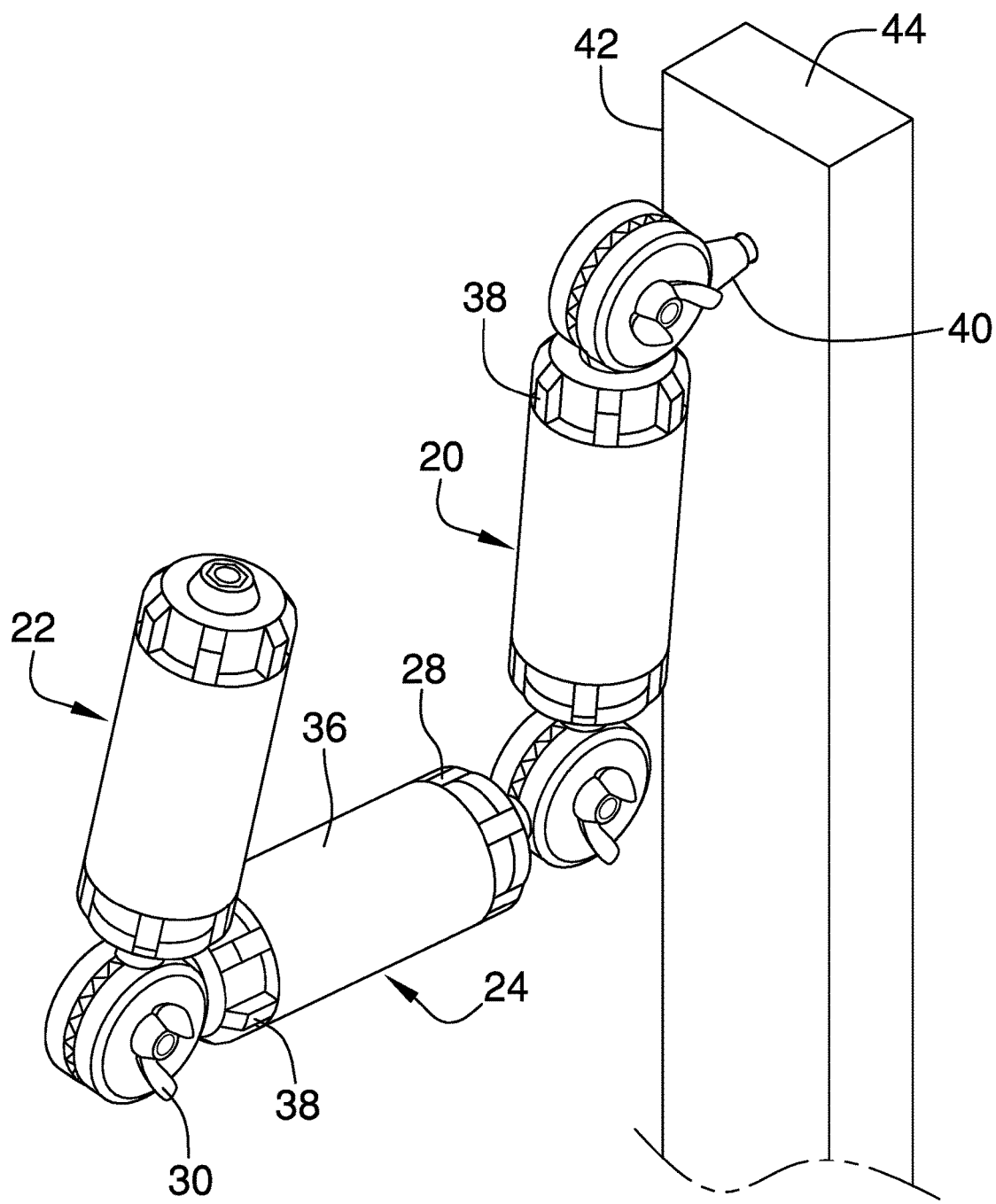
FIG. 2 is a front side view of an embodiment of the disclosure.
Figure 3:
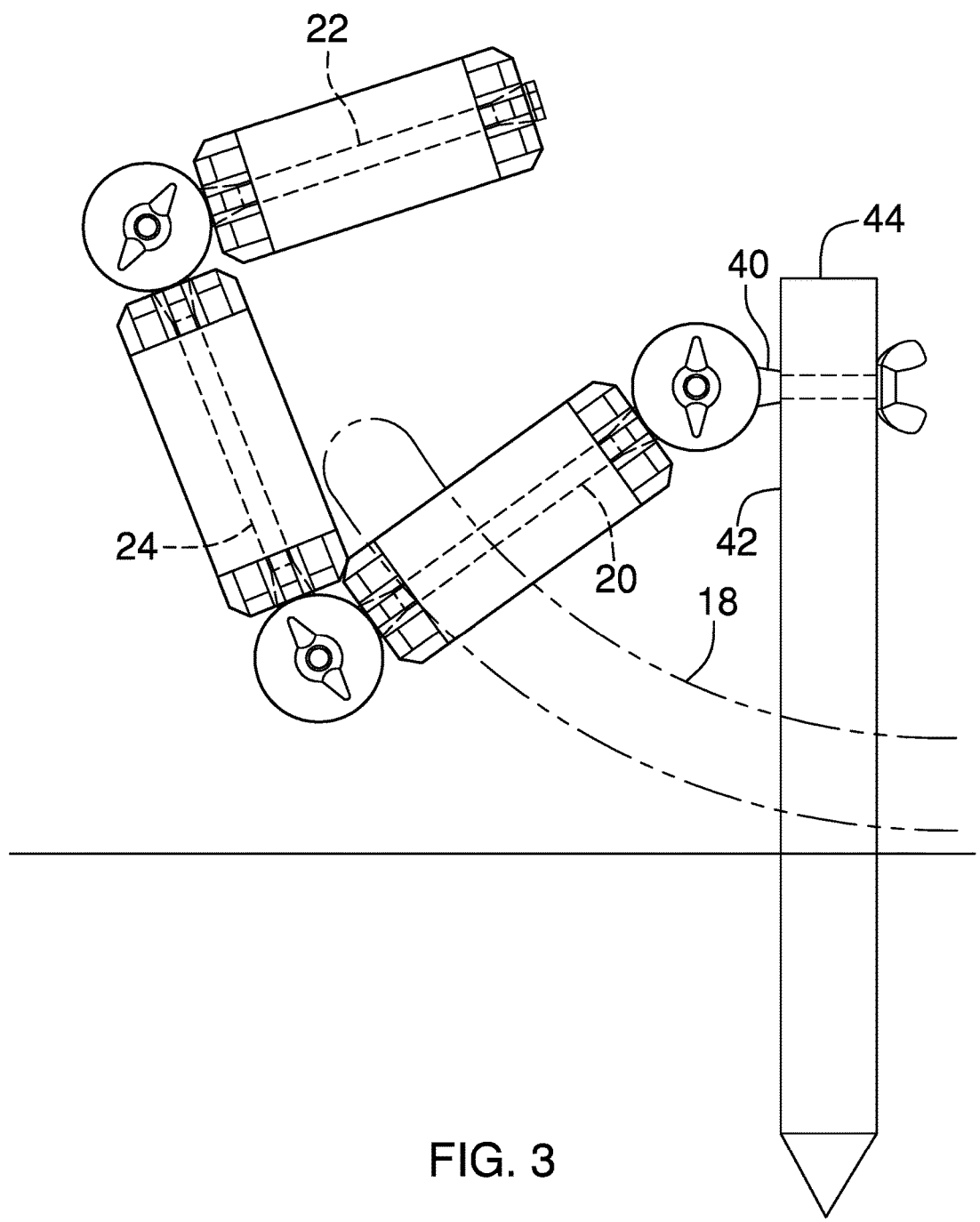
FIG. 3 is a side view of an embodiment of the disclosure with a resting garden hose.
Figure 4:
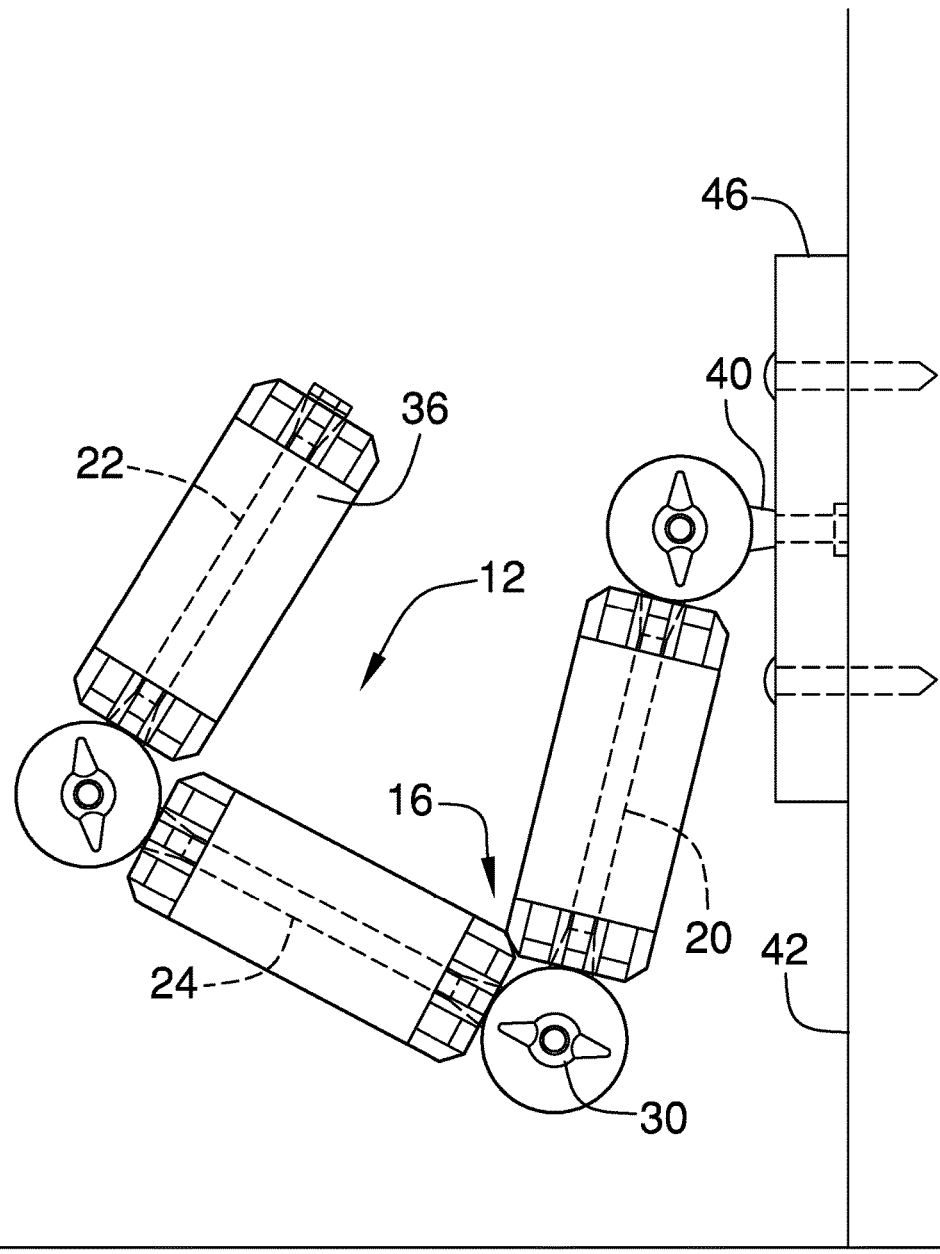
FIG. 4 is a side view of an embodiment of the disclosure.
Figure 5:
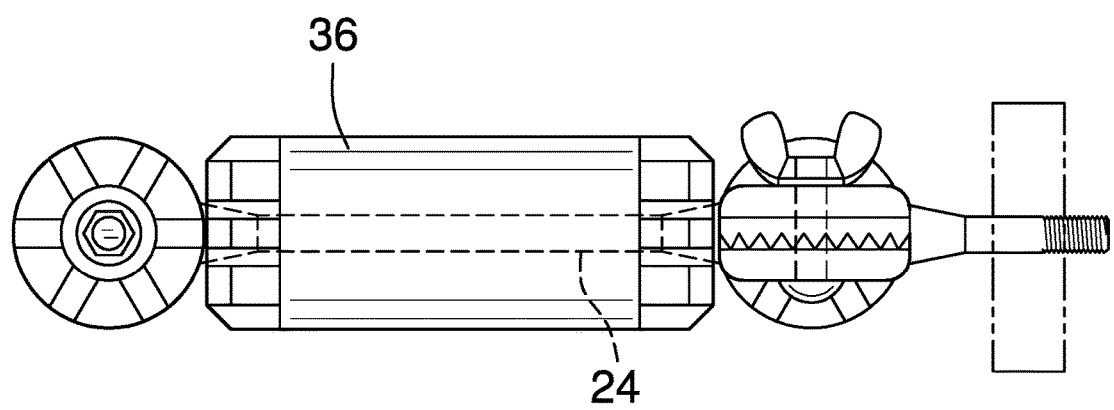
FIG. 5 is a bottom view of an embodiment of the disclosure.
Figure 6:
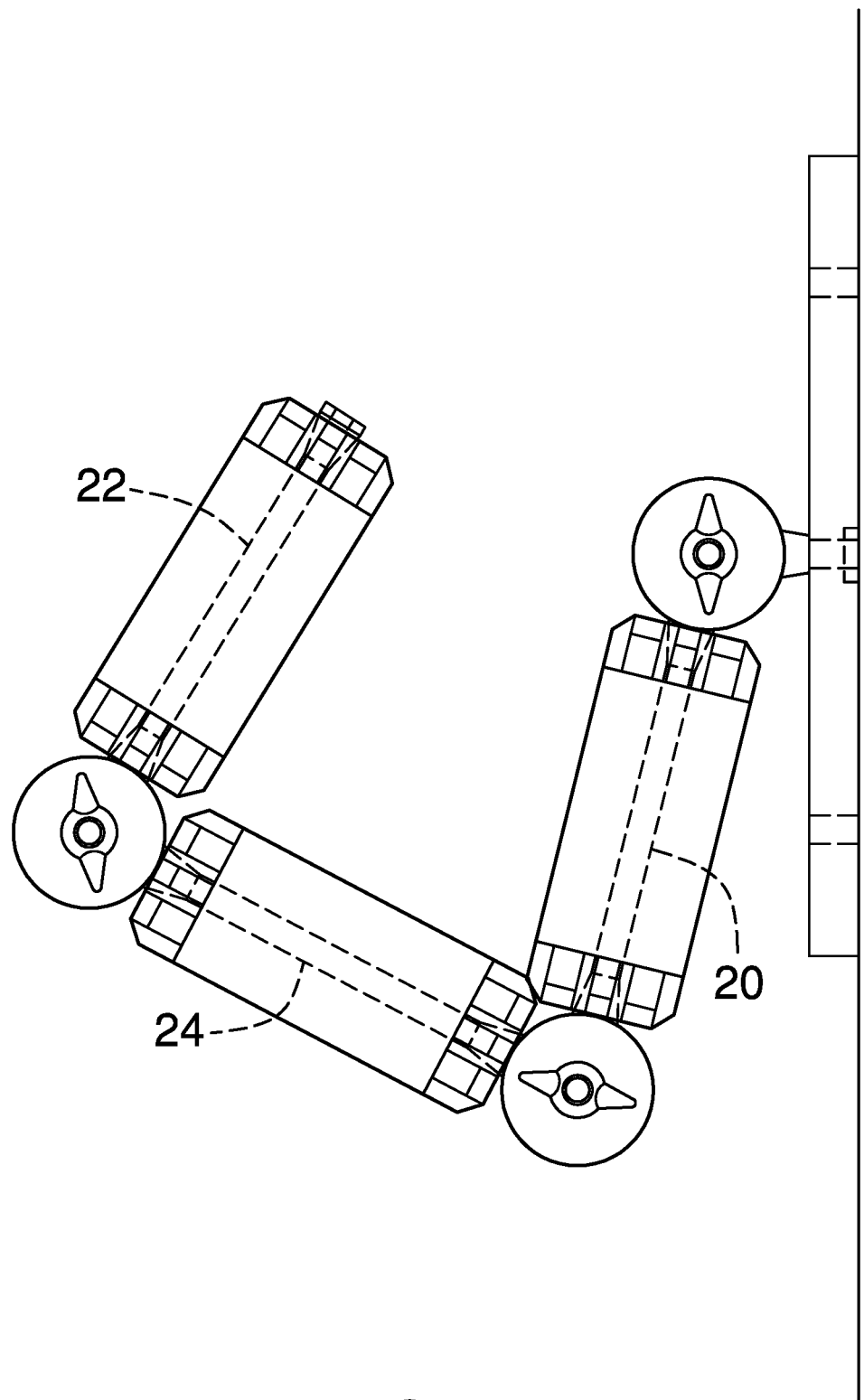
FIG. 6 is a side view of an embodiment of the disclosure.

With reference now to the drawings, and in particular to FIGS. 1 through 6 thereof, a new garden hose support assembly embodying the principles and concepts of an embodiment of the disclosure and generally designated by the reference numeral 10 will be described.

As best illustrated in FIGS. 1 through 6, the garden hose support assembly 10 generally comprises a hold 12 configured to be attached to a support 14. The hold 12 forms a receiving space 16 for receiving a hose 18. The hold 12 includes a first arm 20, a second arm 22 and a middle arm 24 extending between and being attached to the first 20 and second arms 22. The first 20 and second arms 22 are angularly positionable relative to the middle arm 24. The first 22 and second arms 22 are releasably securable in a selected angular position relative to the middle arm 24.

Each of the first 20, second 22 and middle arms 24 may comprise of a connecting rod 26 having a pair of ends. The ends are joined to other connecting rods by mating members 28 such that the mating members 28 are joinable with a fastener 30. The mating members 28 can include interlocking teeth 32, however, other pivoting joints may be utilized. Additionally, the fastener 30 may comprise a butterfly nut and bolt 34, but should be understood as any fastener 30 that can releasably secure the mating members 28.

A plurality of rollers 36 is provided and each of the first 20, second 22 and middle arms 24 has one of the rollers 36 positioned thereon. The rollers 36 are rotatable with respect to the hold 12. The rollers 36 may have a cylindrical shape. Additionally, the roller 36 on the middle arm 24 may engage the roller 36 on the first arm 20 when an angle between the middle arm 24 and the first arm 22 is less than 75°. The roller 36 on the middle arm 24 engages the roller 36 on the second arm 22 when an angle between the middle arm 24 and the second arm 22 is less than 75°. This structure allows engaged ones of the rollers 36 to rotate together. The rollers 36 may each have a pair of ends comprising a plurality of fins 38, such that the fins 38 of adjacent ones of the rollers 36 engage each other when an angle between those adjacent ones of the rollers 36 is less than 75°. This angle may be greater or less depending upon the configuration of the fins 38, but will be less than 90°. Alternate mating configurations may be utilized other than the fins 38 such as, for example, a geared teeth.

A mount 40 is attached to a distal end of the first arm 20 relative to the middle arm 24. The mount 40 is configured to engage a vertically oriented surface 42 such that the hold 12 extends laterally away from the vertically oriented surface 42. The vertically oriented surface 42 may include a stake 44 or a wall surface 46 but should be understood to mean any surface that is vertically oriented. The mount 40 may include a shaft extending into and releasably secured to the vertical surface.

In use, the assembly 10 is used to hold and direct a garden hose. The first 20, middle 24 and second arm 22 form a receiving area allowing a garden hose 18 to be held above ground. The rollers 36 facilitate the movement of the hose 18 through the holder as it is pulled.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A garden hose support assembly configured for supporting a garden hose above a ground surface, said garden hose support assembly comprising:
    a hold configured to be attached to a support, said hold forming a receiving space for receiving a hose, said hold including a first arm, a second arm and a middle arm extending between and being attached to said first and said second arms, said first and second arms being angularly positionable relative to said middle arm, said first and second arms being releasably securable in a selected angular position relative to said middle arm;
    a plurality of rollers, each of said first, second and middle arms having one of said rollers positioned thereon, said rollers being rotatable with respect to said hold;
    a mount being attached to a distal end of said first arm relative to said middle arm, said mount being configured to engage a vertically oriented surface such that said hold extends laterally away from the vertically oriented surface; and
    wherein said roller on said middle arm engages said roller on said first arm when an angle between said middle arm and said first arm is less than 75°, said roller on said middle arm engaging said roller on said second arm when an angle between said middle arm and said second arm is less than 75°, wherein engaged ones of said rollers rotate together.

2. The garden hose support assembly according to claim 1, wherein said rollers each have a cylindrical shape.

3. The garden hose support assembly according to claim 1, wherein said rollers each have a pair of ends comprising a plurality of fins, said fins of said rollers on adjacent ones of said rollers engaging each other when an angle between said adjacent ones of said rollers is less than 75°.

4. A garden hose support assembly configured for supporting a garden hose above a ground surface, said garden hose support assembly comprising:
    a hold configured to be attached to a support, said hold forming a receiving space for receiving a hose, said hold including a first arm, a second arm and a middle arm extending between and being attached to said first and said second arms, said first and second arms being angularly positionable relative to said middle arm, said first and second arms being releasably securable in a selected angular position relative to said middle arm;
    a plurality of rollers, each of said first, second and middle arms having one of said rollers positioned thereon, said rollers being rotatable with respect to said hold, said rollers each having a cylindrical shape, said roller on said middle arm engaging said roller on said first arm when an angle between said middle arm and said first arm is less than 75°, said roller on said middle arm engaging said roller on said second arm when an angle between said middle arm and said second arm is less than 75°, wherein engaged ones of said rollers rotate together, said rollers each having a pair of ends comprising a plurality of fins, said fins of said rollers on adjacent ones of said rollers engaging each other when an angle between said adjacent ones of said rollers is less than 75°; and
    a mount being attached to a distal end of said first arm relative to said middle arm, said mount being configured to engage a vertically oriented surface such that said hold extends laterally away from the vertically oriented surface.

* * * * *